United States Patent
Tsubakino et al.

(10) Patent No.: US 12,517,380 B2
(45) Date of Patent: Jan. 6, 2026

(54) OPTICAL FILTER, COLOR VISION CORRECTION LENS, AND OPTICAL COMPONENT FOR COLOR VISION CORRECTION

(71) Applicant: Panasonic Intellectual Property Management Co., Ltd., Osaka (JP)

(72) Inventors: Yurika Tsubakino, Osaka (JP); Hideki Wada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 549 days.

(21) Appl. No.: 17/769,563

(22) PCT Filed: Oct. 29, 2020

(86) PCT No.: PCT/JP2020/040677
§ 371 (c)(1),
(2) Date: Apr. 15, 2022

(87) PCT Pub. No.: WO2021/085547
PCT Pub. Date: May 6, 2021

(65) Prior Publication Data
US 2023/0044960 A1    Feb. 9, 2023

(30) Foreign Application Priority Data
Oct. 30, 2019   (JP) .................. 2019-196826

(51) Int. Cl.
*G02C 7/10*    (2006.01)
*G02B 5/22*    (2006.01)

(52) U.S. Cl.
CPC ............. *G02C 7/108* (2013.01); *G02B 5/223* (2013.01); *G02B 5/226* (2013.01); *G02C 7/104* (2013.01)

(58) Field of Classification Search
CPC ........... G02C 7/108; G02B 5/22; G02B 5/223
(Continued)

(56) References Cited

U.S. PATENT DOCUMENTS 5,218,386 A * 6/1993 Levien .................... G02C 7/104
                                                         359/464
5,975,695 A * 11/1999 Baiocchi ................ G02C 7/105
                                                         351/44
(Continued)

FOREIGN PATENT DOCUMENTS

JP      11-311756       11/1999
JP      2000-298249     10/2000
(Continued)

OTHER PUBLICATIONS

International Search Report issued in International Pat. Appl. No. PCT/JP2020/040677, dated Jan. 19, 2021, along with an English translation thereof.

*Primary Examiner* — Zachary W Wilkes
(74) *Attorney, Agent, or Firm* — Greenblum & Bernstein, P.L.C.

(57) ABSTRACT

An optical filter in which, in a transmission spectrum of the optical filter, when: a minimum value of transmissivity for a wavelength range of from 400 nm to 450 nm, inclusive, is defined as first minimum value MIN1; a minimum value of transmissivity for a wavelength range of from 525 nm to 595 nm, inclusive, is defined as second minimum value MIN2; a maximum value of transmissivity for a wavelength range of from 450 nm to 525 nm, inclusive, is defined as first maximum value MAX1; and a maximum value of transmissivity for a wavelength range of from 595 nm to 600 nm, inclusive, is defined as second maximum value MAX2, first minimum value MAX1 and second minimum value MIN1

(Continued)

are each at most ½ a smaller one of first maximum value MAX1 and second maximum value MAX2.

7 Claims, 7 Drawing Sheets

(58) Field of Classification Search
USPC ................................................ 351/44, 159.6
See application file for complete search history.

(56) References Cited

U.S. PATENT DOCUMENTS

| | | | |
|---|---|---|---|
| 6,135,595 A | 10/2000 | Takeshita et al. | |
| 6,138,286 A * | 10/2000 | Robrahn | G02C 7/104 |
| | | | 351/44 |
| 7,106,509 B2 * | 9/2006 | Sharp | G02B 27/288 |
| | | | 351/159.6 |
| 8,210,678 B1 * | 7/2012 | Farwig | G02B 5/22 |
| | | | 351/159.65 |
| 8,223,300 B2 * | 7/2012 | Yang | G02B 5/201 |
| | | | 349/106 |
| 9,575,335 B1 * | 2/2017 | McCabe | G02C 7/104 |
| 9,696,472 B2 * | 7/2017 | Kurtz | H04N 13/00 |
| 9,829,724 B1 * | 11/2017 | Perricone | G02C 7/049 |
| 10,073,282 B2 * | 9/2018 | Saylor | G02C 7/101 |
| 10,261,360 B2 * | 4/2019 | Masuda | G02F 1/133603 |
| 10,935,814 B2 * | 3/2021 | Valentine | G02B 5/285 |
| 11,054,671 B2 * | 7/2021 | Martins | G02C 7/108 |
| 11,112,622 B2 * | 9/2021 | Coppa | B29D 11/00413 |
| 2007/0132876 A1 * | 6/2007 | Ohno | H10F 77/413 |
| | | | 257/E31.127 |
| 2009/0303418 A1 * | 12/2009 | Yang | G02F 1/133514 |
| | | | 252/586 |
| 2011/0090453 A1 * | 4/2011 | Chen | G02C 7/104 |
| | | | 351/159.65 |
| 2016/0170220 A1 * | 6/2016 | Kurtz | H04N 13/363 |
| | | | 359/464 |
| 2017/0075143 A1 * | 3/2017 | Saylor | G02C 7/101 |
| 2017/0307794 A1 * | 10/2017 | Hunter | G02C 7/104 |
| 2017/0315384 A1 * | 11/2017 | Saylor | G02C 7/101 |
| 2017/0315405 A1 * | 11/2017 | Masuda | F21V 9/30 |
| 2019/0187489 A1 * | 6/2019 | Valentine | G02C 7/104 |
| 2019/0235282 A1 * | 8/2019 | Coppa | B29D 11/00634 |
| 2019/0271861 A1 * | 9/2019 | Hose | G02C 7/104 |
| 2020/0285078 A1 * | 9/2020 | Martins | G02C 7/108 |

FOREIGN PATENT DOCUMENTS

| | | |
|---|---|---|
| JP | 2002-303830 | 10/2002 |
| JP | 2002-303832 | 10/2002 |
| JP | 2014-134661 | 7/2014 |
| JP | 2017-181648 | 10/2017 |
| JP | 2018-091900 | 6/2018 |
| JP | 2019-101345 | 6/2019 |
| WO | 2019/113357 | 6/2019 |

* cited by examiner

OPTICAL FILTER, COLOR VISION CORRECTION LENS, AND OPTICAL COMPONENT FOR COLOR VISION CORRECTION

TECHNICAL FIELD

The present invention relates to an optical filter, a color vision correction lens, and an optical component for color vision correction.

BACKGROUND ART

Color vision correction filters for aiding the color identification ability of a color blind person are conventionally known. For example, Patent Literature (PTL) 1 discloses a color vision correction filter that suppresses transmissivity of green light for a color blind person having color vision characteristics of strong sensitivity to green color.

CITATION LIST

Patent Literature

[PTL 1] Japanese Unexamined Patent Application Publication No. 2019-101345

SUMMARY OF INVENTION

Technical Problem

However, when the above-described conventional color vision correction filter is used, there is the problem that green traffic lights become difficult to see.

In view of this, the present invention has an object of providing an optical filter, a color vision correction lens, and an optical component for color vision correction which enhance visibility of green traffic lights while ensuring color vision correction function.

Solution to Problem

An optical filter according to an aspect of the present invention in which, in a transmission spectrum of the optical filter, when: a minimum value of transmissivity for a wavelength range of from 400 nm to 450 nm, inclusive, is defined as a first minimum value; a minimum value of transmissivity for a wavelength range of from 525 nm to 595 nm, inclusive, is defined as a second minimum value; a maximum value of transmissivity for a wavelength range of from 450 nm to 525 nm, inclusive, is defined as a first maximum value; and a maximum value of transmissivity for a wavelength range of from 595 nm to 600 nm, inclusive, is defined as a second maximum value, the first minimum value and the second minimum value are each at most ½ a smaller one of the first maximum value and the second maximum value.

A color vision correction lens according to an aspect of the present invention is a color vision correction lens including the above-described optical filter.

An optical component for color vision correction according to an aspect of the present invention is an optical component for color vision correction which includes the above-described optical filter.

Advantageous Effects of Invention

The present invention can provide an optical filter, a color vision correction lens, and an optical component for color vision correction which enhance visibility of green traffic lights while ensuring color vision correction function.

DESCRIPTION OF EMBODIMENTS

Hereinafter, an optical filter, a color vision correction lens, and an optical component for color vision correction according to embodiments of the present invention will be described in detail with reference to the Drawings. It should be noted that each of the embodiments described below shows a specific example of the present invention. The numerical values, shapes, materials, structural components, the arrangement and connection of the structural components, steps, the processing order of the steps, etc., shown in the following embodiments are mere examples, and are therefore not intended to limit the present invention. Furthermore, among the structural components in the following embodiments, structural components not recited in any one of the independent claims are described as optional structural components.

Furthermore, the respective figures are schematic diagrams and are not necessarily precise illustrations. Therefore, for example, the scales, and so on, in the respective figures do not necessarily match. Furthermore, in the figures, elements which are substantially the same are given the same reference signs, and overlapping description is omitted or simplified.

Furthermore, in this Description, terms indicating the shapes of components such as rectangular, etc., as well as numerical ranges are not expressions indicating only strict meanings but also include in their meanings substantially identical ranges such as a difference of about several percent, for example. Furthermore, the term "approximately" means within a range of ±10 percent of a value or a value range.

EMBODIMENT

Configuration

Figure 1:
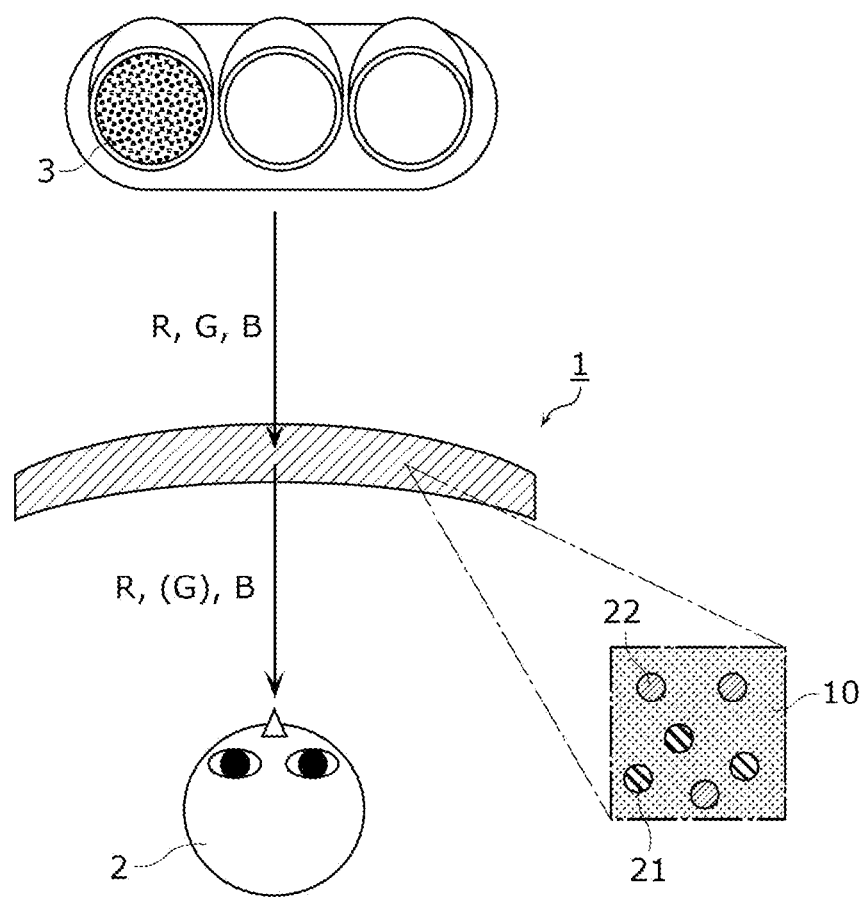
FIG. 1 is a diagram illustrating a configuration of an optical filter according to an embodiment.

First, a configuration of an optical filter according to an embodiment will be described using FIG. 1. FIG. 1 is diagram illustrating a configuration of optical filter 1 according to the present embodiment.

Optical filter 1 illustrated in FIG. 1 is a filter that compensates for color vision deficiency of user 2 who is a color blind person. A typical color blind person is a person with congenital red-green blindness, and strongly perceives green light compared to red light. Optical filter 1 can maintain the balance between red light and green light perception and compensate for the color vision of user 2 by suppressing transmission of green light.

In the present embodiment, optical filter 1 does not completely block the transmission of green light and transmits part of green light. Accordingly, optical filter 1 enhances visibility of the green traffic light of traffic signal 3 while ensuring the color vision correction function for user 2.

As illustrated in FIG. 1, optical filter 1 includes base material 10, and one or more types of absorbent pigment materials contained in base material 10. In FIG. 1, a portion of a cross-section of base material 10 is enlarged and schematically shown inside the rectangular frame enclosed by dash-dot lines. In the example illustrated in FIG. 1, two types of absorbent pigment materials 21 and 22 are included in base material 10.

Base material 10 is a light-transmissive, tabular component. Specifically, base material 10 is a resin base material formed by forming a transparent resin material into a predetermined shape. For example, base material 10 is formed using a resin material such as an acrylic resin, an epoxy resin, a urethane resin, polysilazane, siloxane, allyl diglycol carbonate (CR-39), polysiloxane composite acrylic resin, or polycarbonate. It should be noted that base material 10 may be configured from a transparent glass material.

The thickness of base material is for example at least 1 mm and at most 3 mm. The face of base material 10 on the user 2 side is a concave face. The face of base material 10 on the side facing away from user 2 (i.e., on the traffic signal 3 side) is a convex face. The curvature radius of each of the concave face and the convex face of base material 10 is at least 60 mm and at most 800 mm. Alternatively, the curvature radius of each of the concave face and the convex face of base material 10 may be at least 100 mm and at most 300 mm. In this case, the curvature radii of the concave face and the convex face of base material 10 may be different. For example, the curvature radius of the convex face of base material 10 may be smaller than the curvature radius of the convex face. Furthermore, the convex face and the concave face are, for example, spherical faces but need not be perfect spherical faces. For example, in a cross-sectional view of base material 10, the deviation from circular form of the convex face and the convex face may be at least several μm and at most ten odd μm.

Base material 10 may have a function of condensing or diffusing light of a convex lens or a concave lens, etc. The size and shape of base material 10 are of a size that fits, for example, eyeglasses, a contact lens, etc., that can be worn by a person.

It should be noted that the size and shape of base material 10 is not limited to these examples. The thickness of base material 10 may be less than 1 mm or greater than 3 mm, for example. The thickness of base material 10 may be different depending on the part. In other words, base material 10 may have part that is thin and a part that is thick. Alternatively, base material 10 may be a flat plate having uniform thickness.

Absorbent pigment materials 21 and 22 are dispersed equally inside base material 10. For example, absorbent pigment materials 21 and 22 are dispersed equally over each of the thickness direction and the surface direction of base material 10. Each of absorbent pigment materials 21 and 22 are dispersed in the molecular state in base material 10 while being atomized and configuring a floc body.

It should be noted that absorbent pigment materials 21 and 22 may be dispersed in only some regions of base material 10. For example, absorbent pigment materials 21 and 22 may be dispersed only in a central region in a planar view of base material 10. Alternatively, absorbent pigment materials 21 and 22 may be disposed only in a surface layer portion of the convex face or concave face of base material 10.

The concentration of each of the one or more types of absorbent pigment materials 21 and 22 included in base material 10 is for example at least 30 ppm and at most 400 ppm. The concentration may be adjusted according to the thickness of base material 10, for example.

Each of absorbent pigment materials 21 and 22 absorbs light of a predetermined wavelength component. The absorbance of each of absorbent pigment materials 21 and 22 is for example at least 90 and at most 310. The basic structure of absorbent pigment materials 21 and 22 is for example tetraazaporphyrin-based or phthalocyanine-based. The basic structure may be merocyanine-based or methine-based.

The desired absorption spectrum characteristics can be obtained by adjusting the functional group connected to the basic structure as needed. In the present embodiment, the absorption spectrum of absorbent pigment material 21 and the absorption spectrum of absorbent pigment material 22 are different. Specific examples of the respective absorption spectra will be described later.

[Transmission Spectrum of Optical Filter]

Next, the transmission spectrum of optical filter 1 according to the present embodiment will be described using FIG. 2.

Figure 2:
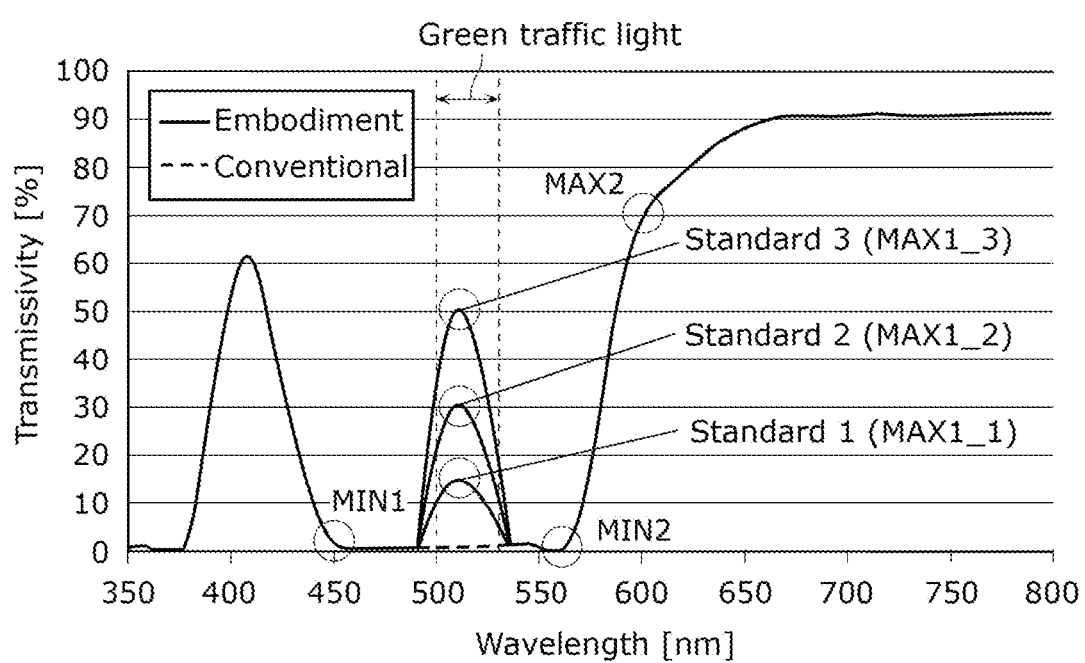
FIG. 2 is a graph illustrating a transmission spectrum of the optical filter according to the embodiment.

FIG. 2 is a graph illustrating the transmission spectrum of optical filter 1 according to the present embodiment. In FIG. 2, the horizontal axis represents wavelengths of light and the vertical axis represents transmissivity for each wavelength (i.e., spectral transmissivity). Spectral transmissivity is the proportion of the spectral radiant flux of emitted light which is transmitted through optical filter 1 to the spectral radiant flux of incident light entering optical filter 1. If the transmissivity for a particular wavelength is 100%, optical filter 1 transmits incident light of the particular wavelength, as emitted light, without reflecting or absorbing the incident light.

In order to use optical filter 1 for color vision correction, there are conditions of transmissivity that have to be satisfied in the transmission spectrum. Specifically, the graph illustrating the transmission spectrum of optical filter 1 satisfies at least two conditions. The first condition is that transmissivity is at most 5 percent for wavelengths from 530 nm to 550 nm, for example. The second condition is that transmissivity increases (graph rises to the right) for wavelengths from 580 nm to 620 nm, for example. It should be noted that the first condition is approximately the same regardless of the extent of the color vision deficiency of the correction subject. For the second condition, the slope of the graph is different depending on the extent of the color vision deficiency of the correction subject.

As indicated by the broken line in FIG. 2, a conventional color vision correction filter satisfies the spectral transmissivity for each of condition 1 and condition 2, and thus the color vision correction function is ensured. However, the conventional color vision correction filter suppresses transmission of green light and thus has the problem that green traffic lights are difficult to see.

A green traffic light is realized by green light-emitting diodes (LEDs) or blue-green LEDs, or a combination of both, for example. Green LEDs have a light emission peak wavelength in a range of from 520 nm to 530 nm, inclusive, for example. Blue-green LEDs have a light emission peak wavelength in a range of from 498 nm to 598 nm, inclusive, for example. It should be noted that, even in the case of a light bulb-type traffic signal, the green light has a light emission peak in a range of from approximately 500 nm to approximately 530 nm, inclusive.

Optical filter 1 according to the present embodiment enhances transmissivity for light having a wavelength ranging from approximately 500 nm to approximately 530 nm, inclusive, (i.e., green light) compared to the conventional color vision correction filter. In FIG. 2, three transmission spectra of standards 1 to 3 are shown according to the magnitude of transmissivity. Since the transmissivity of green light increases in the order of standard 1 to 3, visibility of a green traffic light is enhanced.

At this time, the first condition and the second condition are satisfied with the transmission spectrum of optical filter 1. Specifically, the color vision correction function and ensuring green traffic light visibility can both be achieved by partially transmitting green light while satisfying the required conditions for ensuring color vision correction.

Here, in the transmission spectrum of optical filter 1, the minimum value of transmissivity for a wavelength range of from 400 nm to 450 nm, inclusive, is defined as first minimum value MIN1. The minimum value of transmissivity for a wavelength range of from 525 nm to 595 nm, inclusive, is defined as second minimum value MIN2. The maximum value of transmissivity for a wavelength range of from 450 nm to 525 nm, inclusive is defined as first maximum value MAX1. The maximum value of transmissivity for a wavelength range of from 595 nm to 600 nm, inclusive, is defined as second maximum value MAX2. It should be noted that, in FIG. 2, in order to distinguish between standards 1 to 3, the first maximum value of standard 1 is denoted as MAX1_1, the first maximum value of second standard 2 is denoted as MAX1_2, and the first maximum value of standard 3 is denoted as MAX1_3. When no distinction is made between standards 1 to 3, the first maximum value is denoted simply as MAX1.

At this time, each of first minimum value MIN1 and second minimum value MIN2 is at most ½ the smaller one of first maximum value MAX1 and second maximum value MAX2. As illustrated in FIG. 2, first maximum value MAX1 is smaller than second maximum value MAX2. Therefore, each of first minimum value MIN1 and second minimum value MIN2 is at most ½ of first maximum value MAX1. It should be noted that, in the transmission spectra of standards 1 and 2, first maximum values MAX1_1 and MAX1_are at most ½ of second maximum value MAX2.

Furthermore, the minimum value of transmissivity for a wavelength range of from 470 nm to 600 nm, inclusive, is at most 5%. Moreover, the minimum value of transmissivity for the wavelength range of from 470 nm to 600 nm, inclusive, is located in the range of from 525 nm to 595 nm, inclusive. In other words, the minimum value of transmissivity for the wavelength range of from 470 nm to 600 nm, inclusive, is second minimum value MIN2.

The maximum value of transmissivity for a wavelength range of from 430 nm to 500 nm, inclusive, is at least 10% and at most 90%. Furthermore, the maximum value of transmissivity for a wavelength range of from 430 nm to 500 nm, inclusive, is located in the range of from 450 nm to 500 nm, inclusive. In the example illustrated in FIG. 2, the maximum value of transmissivity for a wavelength range of from 430 nm to 500 nm, inclusive, is the transmissivity when the wavelength is at most 500 nm, and is smaller than first maximum value MAX1.

By satisfying the aforementioned conditions, optical filter 1 has a transmission spectrum in which transmissivity fluctuates in the order of a peak, a valley, a peak, and a peak when traced from the short-wavelength side to the long-wavelength side. Accordingly, the color vision correction function and ensuring green traffic light visibility can both be achieved.

[Transmission Spectrum of Absorbent Pigment Material]

Next, the absorption spectra of absorbent pigment materials used to realize the absorption spectrum illustrated in FIG. 2 will be described using FIG. 3.

Figure 3:
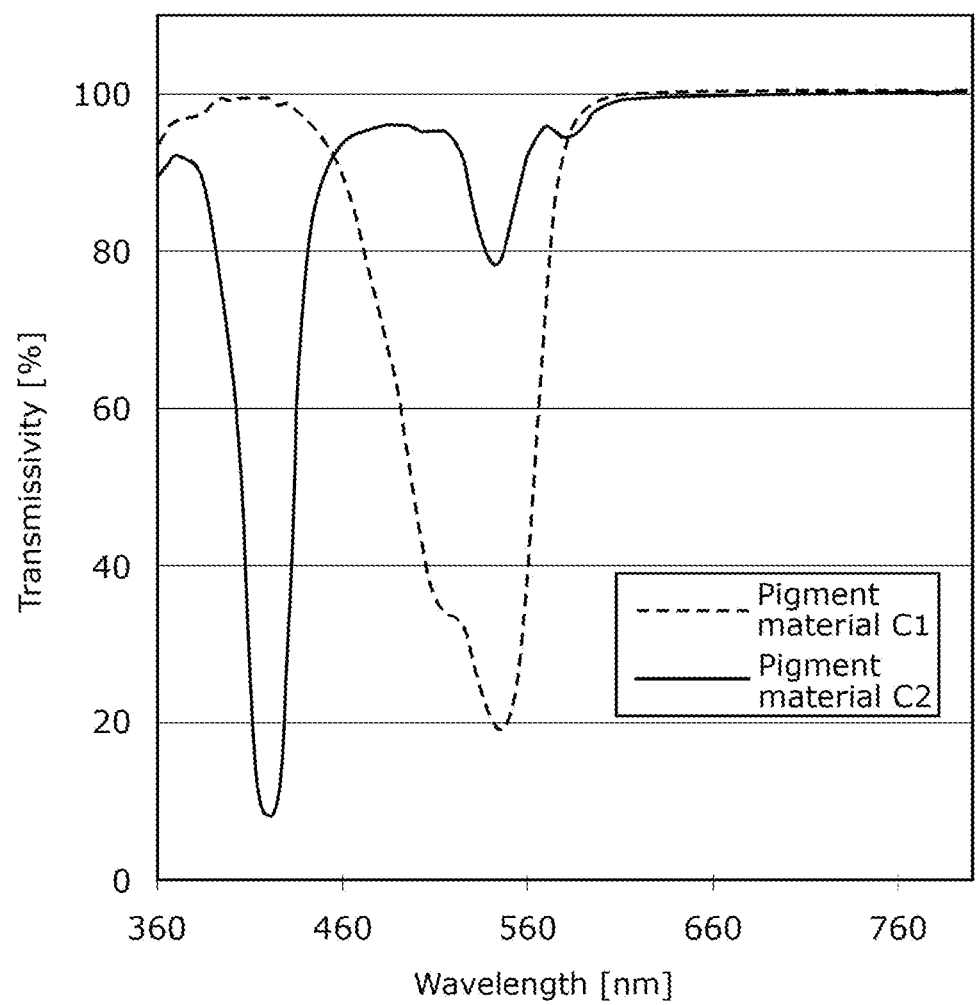
FIG. 3 is a graph illustrating absorption spectra of absorbent pigment materials included in the optical filter according to the embodiment.

FIG. 3 is a graph illustrating absorption spectra of absorbent pigment materials included in optical filter 1 according to the present embodiment. In FIG. 3, the horizontal axis represents wavelengths of light and the vertical axis represents transmissivity of light.

It should be noted that, in FIG. 3, the per wavelength transmissivity of a polycarbonate base material in which the target absorbent pigment materials are dispersed evenly with a predetermined concentration is shown as the spectral spectrum characteristics of the pigment materials. A valley, that is, a portion including the minimum value of transmissivity, in the transmission spectrum is an absorption peak of the absorbent pigment material.

Pigment material C1 is an example of a first type of absorbent pigment material, and corresponds to absorbent pigment material 21. As illustrated in FIG. 3, pigment material C1 has an absorption peak included in a wavelength range of from 540 nm to 550 nm, inclusive, in the absorption spectrum. The half-width of the absorption peak is included in a range of from 70 nm to 125 nm, inclusive, for example.

It should be noted that the half-width is equivalent to the width of the peak when the transmissivity at the peak is a mean value of the maximum value (100%) and the minimum value (specifically, the transmissivity for the peak wavelength). For example, since the minimum value of the transmissivity of pigment material C1 indicated in FIG. 3 is approximately 19%, the half-width is the width of the peak when the transmissivity is approximately 60% (=(100+19)÷2), and is approximately 74 nm. It should be noted that the minimum value of transmissivity at the peak is can be adjusted by the concentration of pigment material C1 included in base material 10. This is also the same for pigment material C2.

Pigment material C2 is an example of a second type of absorbent pigment material, and corresponds to absorbent pigment material 22. As illustrated in FIG. 3, pigment material C2 has an absorption peak included in a wavelength range of from 400 nm to 435 nm, inclusive, in the absorption spectrum. Specifically, the absorption peak of pigment material C2 is included in a range of from 415 nm to 425 nm, inclusive. The half-width of the absorption peak is included in a range of from 20 nm to 45 nm, inclusive, for example. The minimum value of transmissivity of pigment material C2 illustrated in FIG. 3 is the transmissivity at approximately 420 nm, and is approximately 8%. The half-width is the width of the peak when transmissivity is approximately 54% (=(100+8)÷2), and is approximately 32 nm.

In the example illustrated in FIG. 3, the transmissivity for the peak wavelength of pigment material C2 is smaller than the transmissivity for the peak wavelength of pigment material C1. Furthermore, the half-width of the absorption peak of pigment material C2 is shorter than the half-width of the absorption peak of pigment material C1.

WORKING EXAMPLES

Next, optical characteristics of working examples of optical filter 1 formed by appropriately mixing pigment materials C1 and C2 shown in FIG. 3.

Figure 4:
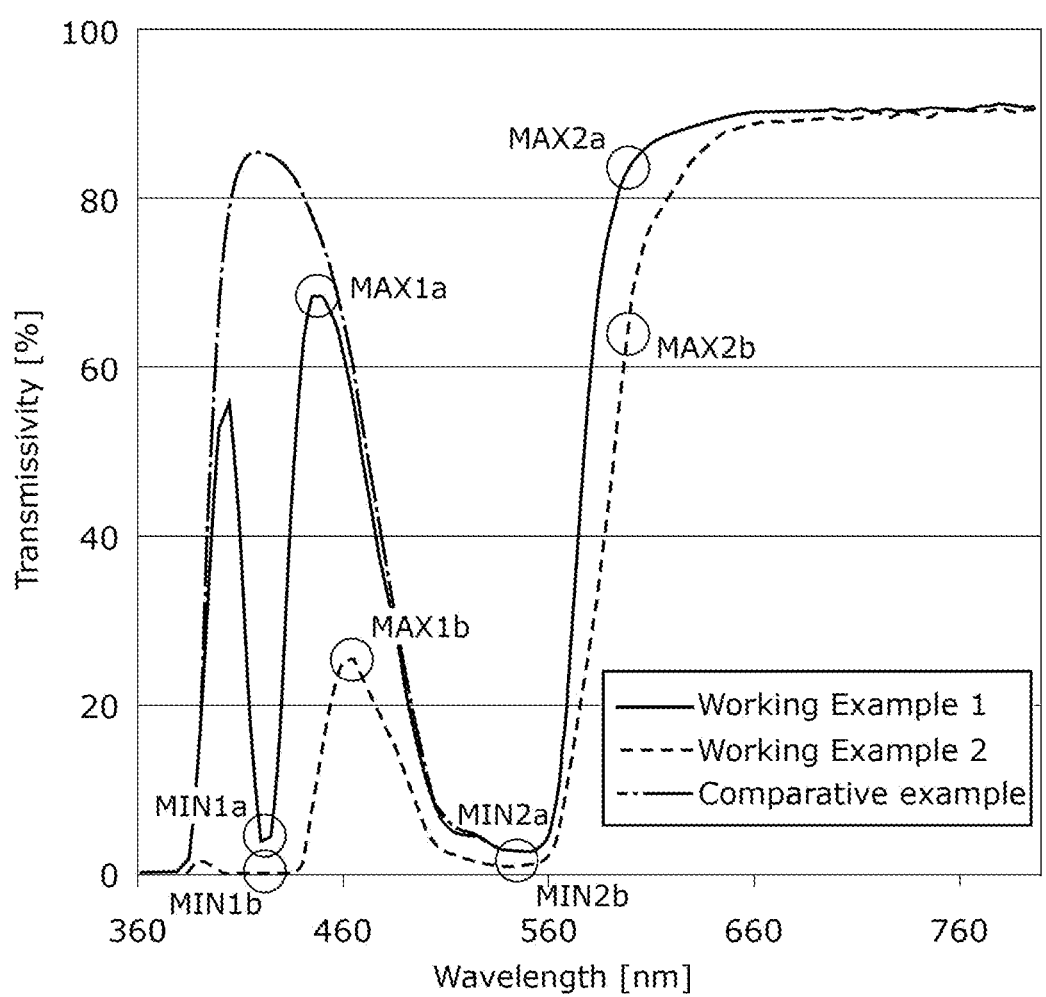
FIG. 4 is a graph illustrating transmission spectra of optical filters according to Working Examples 1 and 2 and a comparative example.
Figure 5:
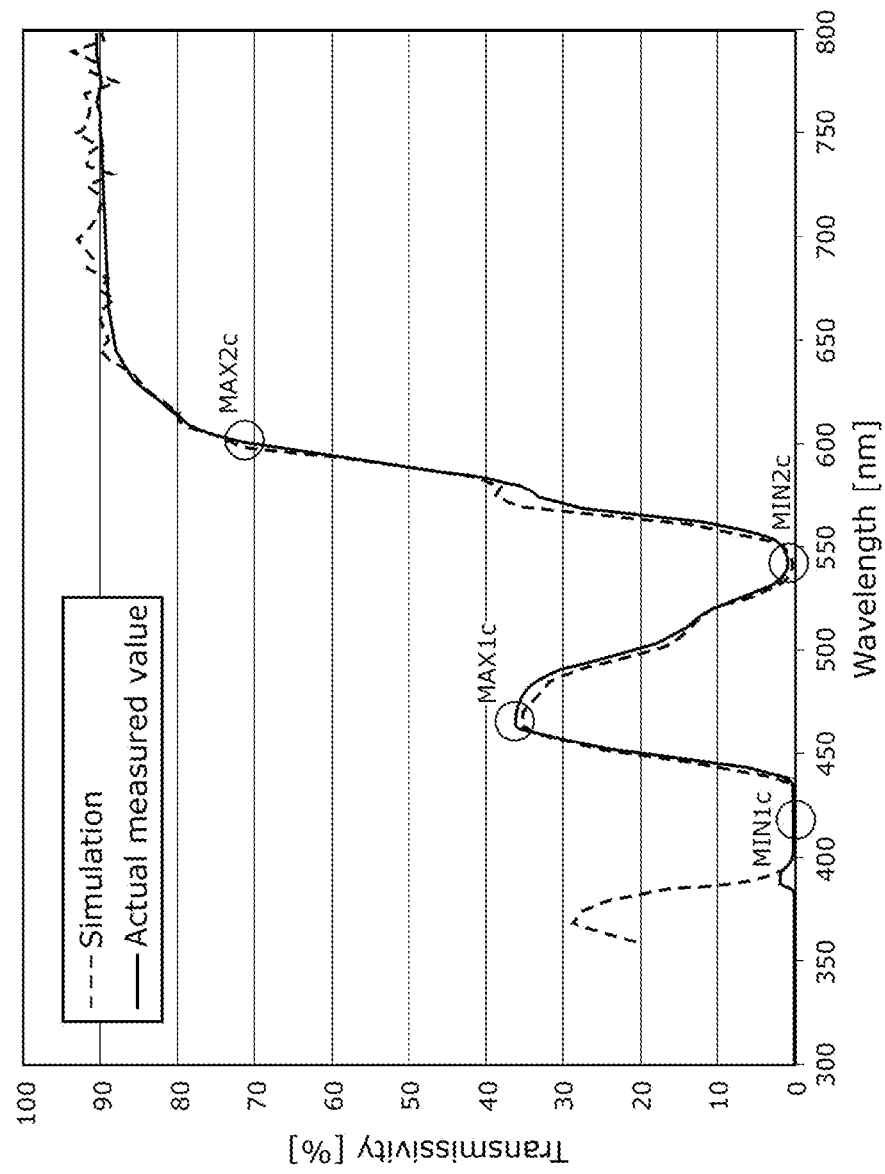
FIG. 5 is a graph illustrating transmission spectra of an optical filter according to Working Example 3.

FIG. 4 is a graph illustrating transmission spectra of optical filters according to Working Examples 1 and 2 as well as a comparative example. FIG. 5 is a graph illustrating transmission spectra of an optical filter according to Working Example 3. In each of FIG. 4 and FIG. 5, the horizontal axis represents wavelengths, and the vertical axis represents transmissivity.

The type and contained amount of pigment materials included in the optical filters according to Working Examples 1 to 3 and the comparative example are as indicated in Table 1 below.

TABLE 1

|  | Pigment material C1 (Peak wavelength: approx. 547 nm) | Pigment material C2 (Peak wavelength: approx. 420 nm) |
| --- | --- | --- |
| Comparative example | 90 ppm | — |
| Working Example 1 | 90 ppm | 16 ppm |
| Working Example 2 | 90 ppm | 32 ppm |
| Working Example 3 | 36 ppm | 320 ppm |

As indicated in Table 1, in the comparative example, only one type of pigment material, pigment material C1, is included. In Working Example 1 to Working Example 3, two types of pigment materials, pigment material C1 and pigment material C2, are included.

Since all of the comparative example and Working Examples 1 to 3 include pigment material C1, as illustrated in FIG. 4 and FIG. 5, transmissivity becomes low in a range that includes approximately 547 nm which is the peak wavelength of the absorption peak of pigment material C1. Since Working Examples 1 to 3 further include pigment material C2, as illustrated in FIG. 4 and FIG. 5, transmissivity becomes low in the vicinity of approximately 420 nm which is the peak wavelength of the absorption peak of pigment material C2. Since the comparative example does not contain pigment material C2, transmissivity is maintained at a high state in the vicinity of approximately 420 nm. It should be noted that, in comparative example and Working Examples 1 to 3, transmissivity becomes substantially 0% in the wavelength range of approximately 380 nm and lower because of the absorption by base material 10.

As illustrated in FIG. 4, in the transmission spectrum according to the comparative example, transmissivity fluctuates in the order of a peak, a valley, and a peak when traced from the short-wavelength side to the long-wavelength side in a wavelength range of 380 nm and higher. In the first peak, the peak wavelength is approximately 410 nm, transmissivity is approximately 86%, and the half-width is approximately 82 nm. In the first valley, the peak wavelength is approximately 550 nm and transmissivity is approximately 3%. In the second peak, transmissivity exceeds 80% at a wavelength of approximately 590 nm, and transmissivity is maintained at approximately 90% in a wavelength range of approximately 660 nm and higher.

In the transmission spectrum according to Working Example 1, transmissivity fluctuates in the order of a peak, a valley, a peak, a valley, and a peak when traced from the short-wavelength side to the long-wavelength side in a wavelength range of 380 nm and higher. Working Example 1 corresponds to the case where the first peak of the comparative example is divided at its center into two peaks and a valley therebetween. In the first peak of Working Example 1, the peak wavelength is approximately 400 nm, transmissivity is approximately 56%, and the half-width is approximately 22 nm. In the first valley, the peak wavelength is approximately 420 nm and transmissivity, which is represented by first minimum value MIN1a, is approximately 4%. In the second peak, peak wavelength is approximately 440 nm, transmissivity, which is represented by first maximum value MAX1a, is approximately 68%, and half-width is approximately 50 nm. In the second valley, the peak wavelength is approximately 550 nm and transmissivity, which is represented by second minimum value MIN2a, is approximately 3%. In the third peak, transmissivity exceeds 80% at a wavelength of approximately 590 nm, and transmissivity is maintained at approximately 90% in a wavelength range of approximately 660 nm and higher.

In the transmission spectrum according to Working Example 1, first maximum value MAX1a is smaller than second maximum value MAX2a. First minimum value MIN1a and second minimum value MIN2a are at most ½ of first maximum value MAX1a.

In the transmission spectrum according to Working Example 2, transmissivity fluctuates in the order of a peak (very small), a valley, a peak (small), a valley, and a peak when traced from the short-wavelength side to the long-wavelength side in a wavelength range of 380 nm and higher. Working Example 2 corresponds to the case where the first and second peaks of Working Example 1 become small. As shown in Table 1, in Working Example 2, the contained amount of pigment material C2 is higher than in Working Example 1. Specifically, the contained amount of pigment material C2 in Working Example 2 is twice the contained amount in Working Example 1. For the reason, absorption of light in a wavelength range including the vicinity of approximately 420 nm by pigment material C2 becomes greater than in Working Example 1, and transmissivity corresponding to the first and second peaks decreases.

Specifically, in the first peak of Working Example 2, the peak wavelength is approximately 390 nm, transmissivity is approximately 2%, and the half-width is approximately 15 nm. In the first valley, the peak wavelength is included in a range of from approximately 400 nm to approximately 440 nm, inclusive, and transmissivity, which is represented by first minimum value MIN1b, is substantially 0%. In the second peak, peak wavelength is approximately 460 nm, transmissivity, which is represented by first maximum value MAX1b, is approximately 26%, and the half-width is approximately 40 nm. In the second valley, the peak wavelength is approximately 550 nm and transmissivity, which is represented by second minimum value MIN2b, is approximately 1%. In the third peak, transmissivity exceeds 80% at a wavelength of approximately 620 nm, and transmissivity is maintained at approximately 90% in a wavelength range of approximately 660 nm and higher.

In the transmission spectrum according to Working Example 2, first maximum value MAX1b is smaller than second maximum value MAX2b. Specifically, first maximum value MAX1b is at most ½ of second maximum value MAX2b. First minimum value MIN1b and second minimum value MIN2b are at most ½ of first maximum value MAX1b.

As illustrated in FIG. 5, in the transmission spectrum according to Working Example 3, transmissivity fluctuates in the order of a peak (very small), a valley, a peak, a valley, and a peak when traced from the short-wavelength side to the long-wavelength side in a wavelength range of 380 nm and higher.

Specifically, in the first peak of Working Example 3, the peak wavelength is approximately 380 nm, transmissivity is approximately 2%, and the half-width is approximately 10 nm. In the first valley, the peak wavelength is included in a range of from approximately 400 nm to approximately 435 nm, inclusive, and transmissivity, which is represented by first minimum value MIN1c, is substantially 0%. In the second peak, peak wavelength is approximately 470 nm, transmissivity, which is represented by first maximum value MAX1c, is approximately 36%, and the half-width is approximately 60 nm. In the second valley, the peak wavelength is approximately 540 nm and transmissivity, which is represented by second minimum value MIN2c, is approximately 1%. In the third peak, transmissivity exceeds 80% at a wavelength of approximately 620 nm, and transmissivity is maintained at approximately 90% in a wavelength range of approximately 660 nm and higher.

In the transmission spectrum according to Working Example 3, first maximum value MAX1c is smaller than second maximum value MAX2c. Specifically, first maximum value MAX1c is at most ½ of second maximum value MAX2c. First minimum value MIN1c and second minimum value MIN2c are at most ½ of first maximum value MAX1c.

It should be noted that, in FIG. 5, a simulation result based on the contained amount and absorption spectra of pigment materials C1 and C2 indicated in Table 1 is represented by a broken line. The simulation result and actual measured values approximately match, and thus it can be understood that a transmission spectrum as in the simulation can be obtained.

As shown in Table 1, in Working Example 3, the contained amount of pigment material C2 is higher than the contained amount of pigment material C1. Specifically, the contained amount of pigment material C2 is approximately 9 times the contained amount of pigment material C1. It should be noted that the ratio between the contained amount of pigment material C1 and the contained amount of pigment material C2 is not particularly limited, and it is sufficient that the transmission spectrum obtained satisfies a predetermined condition. The predetermined condition is the condition for appropriately performing color vision correction and enhancing visibility of a green traffic light of a traffic signal. Specifically, the predetermined condition is that each of first minimum value MIN1 and second minimum value MIN2 are at most ½ the smaller one first maximum value MAX1 and second maximum value MAX2.

As previously described, in order to compensate for color vision deficiency, it is sufficient that the transmission spectrum substantially satisfies the first condition and the second condition. All the transmission spectra according to Working Examples 1 to 3 satisfy the first condition and the second condition. Therefore, the color vision correction function is ensured in the optical filter according to each of Working Examples 1 to 3.

It should be noted that, in terms of enhancing green traffic light visibility, first maximum values MAX1a, MAX1b, and MAX1c of the respective transmission spectra according to Working Examples 1 to 3 are approximately 68%, approximately 26%, and approximately 36%, respectively. Therefore, since first maximum value MAX1a is greater than first maximum values MAX1b and MAX1c, the optical filter according to Working Example 1 has the highest green traffic light visibility. The optical filters according to Working Examples 1 to 3 correspond respectively to standard 3, standard 1, and standard 2 indicated in FIG. 2.

[Optical Component]

Above-described optical filter 1 is used in various optical components.

Figure 6:
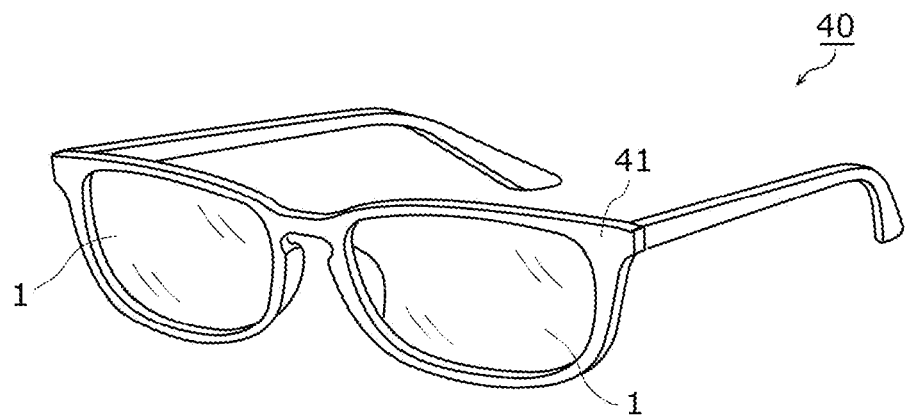
FIG. 6 is a perspective view of eyeglasses for color vision correction which include the optical filter according to the embodiment.
Figure 7:
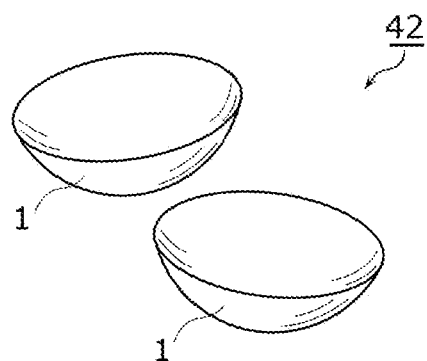
FIG. 7 is a perspective view of contact lenses for color vision correction which include the optical filter according to the embodiment.
Figure 8:
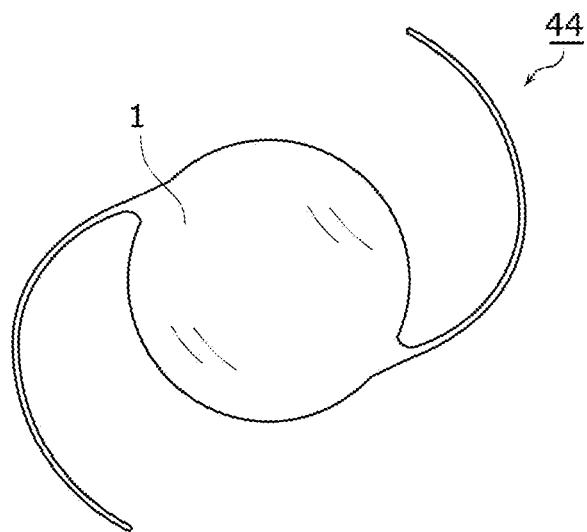
FIG. 8 is a perspective view of an intraocular lens for color vision correction which includes the optical filter according to the embodiment.
Figure 9:
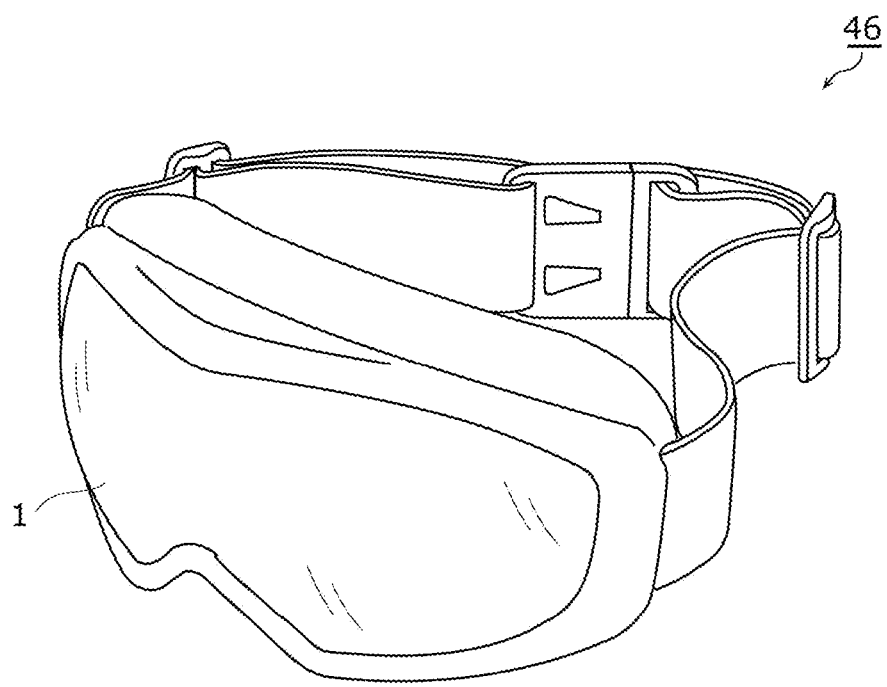
FIG. 9 is a perspective view of goggles for color vision correction which include the optical filter according to the embodiment.

FIG. 6 to FIG. 9 are diagrams illustrating examples of optical components including optical filter 1 according to the present embodiment. Specifically, FIG. 6, FIG. 7, and FIG. 9 are perspective views of eyeglasses 40, contact lenses 42, and goggles 46, respectively, which are examples of optical components. FIG. 8 is a plan view of intraocular lens 44 which is an example of an optical component. For example, as illustrated in the respective the figures, each of eyeglasses 40, contact lenses 42, intraocular lens 44, and goggles 46 includes optical filter 1.

For example, eyeglasses 40 includes two optical filters 1 as left and right lenses, and frame 41 which supports the two optical filters 1. The entirety of each of contact lenses 42 and intraocular lens 44 consists of optical filter 1. Alternatively, it is also acceptable that only the central portions of each of contact lenses 42 and intraocular lens 44 consists of optical filter 1. Contact lenses 42 and intraocular lens 44 are examples of color vision correction lenses that include optical filter 1 according to the present embodiment. Goggles 46 includes a single optical filter 1 as a cover lens which covers both eyes.

Advantageous Effects, Etc.

As described above, with optical filter 1 according to the present embodiment, in a transmission spectrum of the optical filter, when: a minimum value of transmissivity for a wavelength range of from 400 nm to 450 nm, inclusive, is defined as first minimum value MIN1; a minimum value of transmissivity for a wavelength range of from 525 nm to 595 nm, inclusive, is defined as second minimum value MIN2; a maximum value of transmissivity for a wavelength range of from 450 nm to 525 nm, inclusive, is defined as first maximum value MAX1; and a maximum value of transmissivity for a wavelength range of from 595 nm to 600 nm, inclusive, is defined as second maximum value MAX2, first minimum value MIN1 and second minimum value MIN2 are each at most ½ a smaller one of first maximum value MAX1 and second maximum value MAX2.

Accordingly, the maximum value (first maximum value) of transmissivity for a range of from 450 nm to 525 nm, inclusive, becomes bigger than the minimum value (first minimum value) of the short-wavelength side and the minimum value (second minimum value) of the long-wavelength side of the first maximum value. Specifically, since a peak in which transmissivity becomes maximal can be formed in the range of from 450 nm to 525 nm, inclusive, the light included in the range of from 450 nm to 525 nm, inclusive, can be partially transmitted. Since transmissivity for light emitted by a typical green traffic light is enhanced, visibility of a green traffic light can be enhanced when user 2 looks at traffic signal 3 via optical filter 1, for example. Furthermore, since portions (valleys) in which transmissivity becomes minimal are formed on both sides of the peak in which transmission becomes maximal in the range of from 450 nm to 525 nm, inclusive, transmission of green light can be suppressed. Therefore, optical filter 1 can appropriately compensate for the color vision of a color blind person who strongly perceives green light compared to red light. In this manner, optical filter 1 according to the present embodiment can enhance green traffic light visibility while ensuring the color vision correction function.

Furthermore, for example, first maximum value MAX1 is at most ½ second maximum value MAX2.

Accordingly, since the maximum value of the peak for transmitting green light in order to enhance green traffic light visibility becomes smaller, the color vision correction function can be enhanced. For this reason, color vision correction for a person with a high degree of color vision deficiency can be appropriately performed.

Furthermore, for example, in the transmission spectrum: a minimum value of transmissivity for a wavelength range of from 470 nm to 600 nm, inclusive, is at most 5 percent, and is located within a wavelength range of from 525 nm to 595 nm, inclusive; and a maximum value of transmissivity for a wavelength range of from 430 nm to 500 nm, inclusive, is at least 10 percent and at most 90 percent, and is located in a wavelength range of from 450 nm to 500 nm, inclusive.

Accordingly, green traffic light visibility can be enhanced while ensuring the color vision correction function.

Furthermore, for example, optical filter 1 includes: resin base material 10; and one or more types of absorbent pigment materials contained in resin base material 10.

Accordingly, by realizing a desired transmission spectrum through the use absorbent pigment materials, glittering (reflection of light) on the surface of optical filter 1 can be suppressed further than when using a reflective coat.

Furthermore, for example, the one or more types of absorbent pigment materials each have a concentration of at least 30 ppm and at most 400 ppm.

Furthermore, for example, the one or more types of absorbent pigment materials include: a first type of absorbent pigment material having an absorption peak in a wavelength range of from 540 nm to 550 nm, inclusive, in an absorption spectrum; and a second type of absorbent pigment material having an absorption peak in a wavelength range of from 400 nm to 435 nm, inclusive, in an absorption spectrum.

Accordingly, a transmission spectrum that satisfies the condition for ensuring the color vision correction function and ensuring green traffic light visibility can be realized by combining two types of pigment materials.

Furthermore, for example, a color vision correction lens is a color vision correction lens that includes optical filter 1. Furthermore, for example, an optical component is an optical component for color vision correction that includes optical filter 1. Furthermore, for example, the optical component is glasses 40, contact lens 42, intraocular lens 44, or goggle 46.

Accordingly, an optical component that can be worn by user 2, such as eyeglasses 40, can be realized. If user 2 were to wear eyeglasses 40 for which outward coloring is not suppressed, this may impart a feeling of discomfort to other people. According to the present embodiment, the outward coloring of eyeglasses 40 is suppressed, and thus it is possible to reduce the discomfort imparted to other people in everyday life.

OTHER EMBODIMENTS

Although an optical filter, a color vision correction lens, and an optical component for color vision correction according to the present invention are described above based on the foregoing embodiment, the present invention is not limited to the foregoing embodiment.

For example, although the foregoing embodiment describes an example which realizes a transmission spectrum that satisfies the condition for ensuring the color vision correction function and ensuring green traffic light visibility by using two types of pigment materials, the present invention is not limited to such configuration.

For example, the one or more types of absorbent pigment materials included in the optical filter may include only a first type of absorbent pigment material. For example, the first type of absorbent pigment material may have, in a transmission spectrum, a first absorption peak included in a wavelength range of from 540 nm to 550 nm, inclusive, and a second absorption peak included in a wavelength range of from 400 nm to 435 nm, inclusive. In this manner, the desired transmission spectrum can be realized with only one type of pigment material having two absorption peaks.

Furthermore, for example, at this time, the one or more types of absorbent pigment material may further include, not only the above-described first type of absorbent pigment material, but also a second type of absorbent pigment material having an absorption spectrum different from the first type of absorbent pigment material. The second type of absorbent pigment material may have, in the absorption spectrum, an absorption peak included in a wavelength range of from 400 nm to 435 nm, inclusive. Accordingly, transmissivity for the wavelength range of from 400 nm to 435 nm, inclusive, can be further reduced, and thus the color vision correction function of optical filter 1 can be further enhanced.

At this time, for example, the first absorption peak may be a peak having a higher absorbance than the second absorption peak. Accordingly, the second absorption peak of the first type of absorbent pigment material can be supplemented. Compared to when the desired transmission spectrum is realized using only one type of pigment material, the transmission spectrum can be readily adjusted.

Alternatively, for example, the second type of absorbent pigment material may have, in the absorption spectrum, an absorption peak included in a wavelength range of from 540 nm to 550 nm, inclusive. Accordingly, transmissivity for the wavelength range of from 540 nm to 550 nm, inclusive, can be further reduced, and thus the color vision correction function of optical filter 1 can be further enhanced.

At this time, for example, the second absorption peak may be a peak having a higher absorbance than the first absorption peak. Accordingly, the first absorption peak of the first type of absorbent pigment material can be supplemented. Compared to when the desired transmission spectrum is realized using only one type of pigment material, the transmission spectrum can be readily adjusted.

Furthermore, for example, although the foregoing embodiment describes an example which realizes the transmission spectrum of optical filter 1 by adjusting the type and contained amount of absorbent pigment material, the present invention is not limited to such configuration. For example, optical filter 1 may include base material 10 that does not contain an absorbent pigment material, and a dielectric multilayer thin film provided on the surface of base material 10. The transmission spectrum of optical filter 1 may be realized by using light interference by the dielectric multilayer thin film.

Furthermore, for example, base material 10 of optical filter 1 may be a flat plate. Specifically, a first face of base material 10 which faces user 2 and a second face of base material 10 which is on the reverse side of the first face may both be flat faces. Furthermore, the second face of base 10 may be a concave face.

Aside from the above, forms obtained by making various modifications to respective embodiments which can be conceived by those skilled in the art as well as forms realized by any combination of structural elements and functions in the respective embodiments within the essence of the present invention are included in the present invention.

The invention claimed is:

1. An optical filter, comprising:
   a base material; and
   one or more types of absorbent pigment materials contained in the base material,
   wherein, in a transmission spectrum of the optical filter, in a state in which:
      a minimum value of transmissivity for a wavelength range of from 400 nm to 450 nm, inclusive, is defined as a first minimum value;
      a minimum value of transmissivity for a wavelength range of from 525 nm to 595 nm, inclusive, is defined as a second minimum value;
      a maximum value of transmissivity for a wavelength range of from 450 nm to 525 nm, inclusive, is defined as a first maximum value; and
      a maximum value of transmissivity for a wavelength range of from 595 nm to 600 nm, inclusive, is defined as a second maximum value,
   the first minimum value and the second minimum value are each at most ½ the first maximum value,
   the first maximum value is at most ½ the second maximum value,
   the transmission spectrum includes a peak in which transmission becomes maximal in the range of from 450 nm to 525 nm, inclusive,
   transmissivity for a peak wavelength of the peak is the first maximum value, and is at least 26 percent,
   wherein the one or more types of absorbent pigment materials include:
      a first type of absorbent pigment material having an absorption peak in a wavelength range of from 540 nm to 550 nm, inclusive, in an absorption spectrum; and
      a second type of absorbent pigment material having an absorption peak in a wavelength range of from 400 nm to 435 nm, inclusive, in an absorption spectrum.

2. The optical filter according to claim 1, wherein in the transmission spectrum:
   a minimum value of transmissivity for a wavelength range of from 470 nm to 600 nm, inclusive, is at most 5 percent, and is located within a wavelength range of from 525 nm to 595 nm, inclusive; and
   a maximum value of transmissivity for a wavelength range of from 430 nm to 500 nm, inclusive, is at least 10 percent and at most 50 percent, and is located in a wavelength range of from 450 nm to 500 nm, inclusive.

3. The optical filter according to claim 1, wherein the base material is a resin base material.

4. The optical filter according to claim 1, wherein the one or more types of absorbent pigment materials each have a concentration of at least 30 ppm and at most 400 ppm.

5. A color vision correction lens comprising the optical filter according to claim 1.

6. An optical component for color vision correction that is a pair of glasses, a contact lens, an intraocular lens, or a pair of goggles, the optical component comprising the optical filter according to claim 1.

7. An optical filter, comprising:
   a base material; and
   one or more types of absorbent pigment materials contained in the base material,
   wherein, in a transmission spectrum of the optical filter, in a state in which:
      a minimum value of transmissivity for a wavelength range of from 400 nm to 450 nm, inclusive, is defined as a first minimum value;
      a minimum value of transmissivity for a wavelength range of from 525 nm to 595 nm, inclusive, is defined as a second minimum value;
      a maximum value of transmissivity for a wavelength range of from 450 nm to 525 nm, inclusive, is defined as a first maximum value; and
      a maximum value of transmissivity for a wavelength range of from 595 nm to 600 nm, inclusive, is defined as a second maximum value,
   the first minimum value and the second minimum value are each at most ½ a smaller one of the first maximum value and the second maximum value,
   wherein in the transmission spectrum:
      a minimum value of transmissivity for a wavelength range of from 470 nm to 600 nm, inclusive, is at most 5 percent, and is located within a wavelength range of from 540 nm to 595 nm, inclusive; and
      a maximum value of transmissivity for a wavelength range of from 430 nm to 500 nm, inclusive, is at least 10 percent and at most 90 percent, and is located in a wavelength range of from 450 nm to 500 nm, inclusive, and
   wherein the one or more types of absorbent pigment materials include:
      a first type of absorbent pigment material having an absorption peak in a wavelength range of from 540 nm to 550 nm, inclusive, in an absorption spectrum; and
      a second type of absorbent pigment material having an absorption peak in a wavelength range of from 400 nm to 435 nm, inclusive, in an absorption spectrum.

* * * * *